(12) United States Patent
Kusakari et al.

(10) Patent No.: US 6,728,455 B2
(45) Date of Patent: Apr. 27, 2004

(54) OPTICAL FIBER DROP CABLE AND MANUFACTURING METHOD THEREOF

(75) Inventors: Masahiro Kusakari, Chiba (JP); Kazunaga Kobayashi, Chiba (JP); Shimei Tanaka, Chiba (JP); Keiji Ohashi, Chiba (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 10/232,389

(22) Filed: Sep. 3, 2002

(65) Prior Publication Data

US 2003/0044138 A1 Mar. 6, 2003

(30) Foreign Application Priority Data

Sep. 4, 2001 (JP) ......................... 2001-267045
Jan. 11, 2002 (JP) ......................... 2002-004573

(51) Int. Cl.[7] ................................................ G02B 6/44
(52) U.S. Cl. ................................................ 385/113
(58) Field of Search .................................. 385/113, 114, 385/100, 106

(56) References Cited

U.S. PATENT DOCUMENTS 4,971,419 A * 11/1990 Gartside et al. ............ 385/106
5,050,957 A * 9/1991 Hamilton et al. ........... 385/113
5,155,304 A * 10/1992 Gossett et al. ........... 174/117 R
5,448,670 A * 9/1995 Blew et al. ................. 385/112

FOREIGN PATENT DOCUMENTS

| JP | 62-94807 | 5/1987 |
| JP | 2000-171673 | 6/2000 |
| JP | 2001-83385 | * 3/2001 |

OTHER PUBLICATIONS

Y. Nakatsuii, et al., Proceedings of the 1997 IECE General Conference, B–10–20, pp. 529, "Studies on Optical Cable for Residential Premises and Office Buildings," Mar. 24–27, 1997 (with partial English translation).

M. Kusakari, et al., Proceedings of the 1997 Communications Society Conference of IEICE, B–10–22, pp. 321, "Development of Optical Drop Cable," Sep. 3–6, 1997 (with partial English translation).

* cited by examiner

Primary Examiner—Tulsidas C. Patel
(74) Attorney, Agent, or Firm—Oblon, Spivak, McClelland, Maier & Neustadt, P.C.

(57) ABSTRACT

An optical drop cable includes an optical element portion having an optical fiber core wire and at least one pair of first tension bodies covered with a cable sheath. A support wire portion includes a second tension body covered with a sheath. Both portions are fixed together. The first tension bodies are composed of a flexible plastic material.

13 Claims, 8 Drawing Sheets

FIG.7

| ITEM | PROPERTY |
|---|---|
| DIAMETER | ABOUT 0.4ø |
| TENSILE STRENGTH | ABOUT 95N |
| TENSILE ELASTIC MODULUS | 26000N/mm² |

FIG.8

| ITEM | PROPERTY | NOTES |
|---|---|---|
| OPTICAL TRANSMISSION LOSS | LESS THAN OR EQUAL TO 0.25dB/km | (@1.55μm) |
| THERMAL PROPERTY (@1.55μm) | LESS THAN OR EQUAL TO 0.30dB/km | TEMPERATURE RANGE: −30 ∼ +70℃ (@1.55μm) |
| MECHANICAL PROPERTIES (SIDE COMPRESSION) | LESS THAN OR EQUAL TO 0.1dB | 1200N/25mm (@1.55μm) |
| (BENDING) | LESS THAN OR EQUAL TO 0.1dB | R30, ±90°×10C (@1.55μm) |
| (IMPACT) | LESS THAN OR EQUAL TO 0.1dB | 0.3kg·m×1C (@1.55μm) |
| (TORSION) | LESS THAN OR EQUAL TO 0.1dB | L=1m, ±90°×1C (@1.55μm) |
| (TENSION) | LESS THAN OR EQUAL TO 0.1dB | 70kg (@1.55μm) |

FIG.9
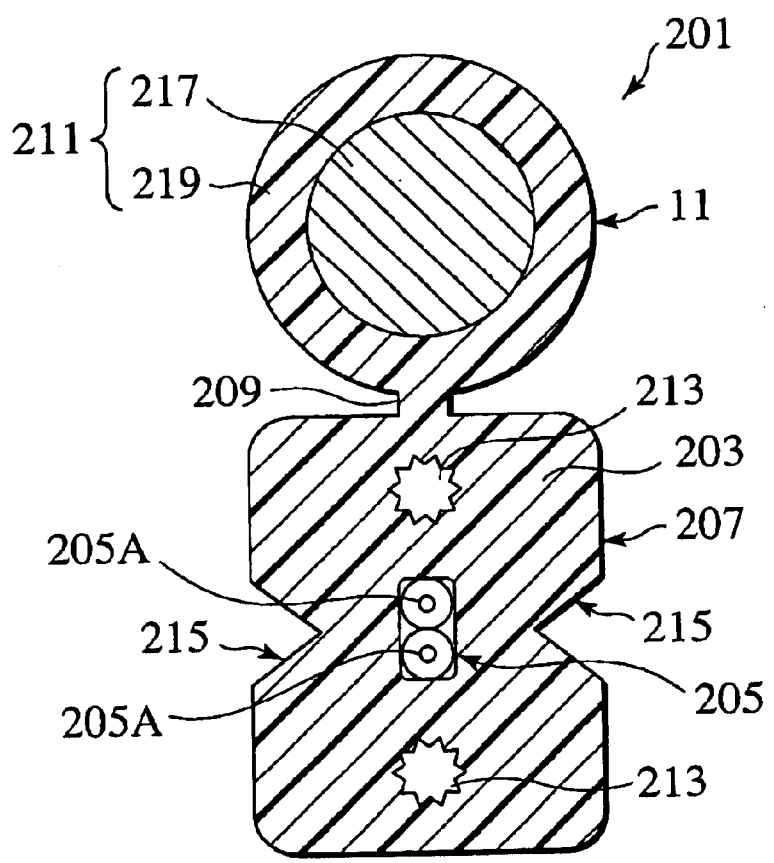
FIG.10
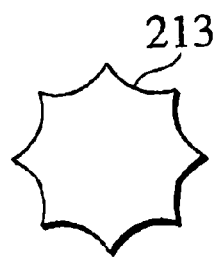
(A)
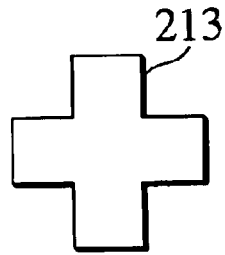
(B)
(C)

FIG.12

| | PROFILE OF TENSION BODY | SIZE OF CROSS SECTION OF TENSION BODY | DRAWING FORCE (N/cm) |
|---|---|---|---|
| SAMPLE 1 | CIRCULAR | 0.6mmø | ABOUT 1~5 |
| SAMPLE 2 | 8-SPINES ASTEROID-SHAPED | DIAMETER OF CIRCUMCIRCLE : ABOUT 0.6mmø INCIRCLE : ABOUT 0.4mmø | 10 |

FIG.13

| ITEM | PROPERTY | NOTES |
|---|---|---|
| OPTICAL TRANSMISSION LOSS | LESS THAN OR EQUAL TO 0.25dB/km | (@1.55µm) |
| THERMAL PROPERTY (@1.55µm) | LESS THAN OR EQUAL TO 0.30dB/km | TEMPERATURE RANGE : −30 ~ +70°C (@1.55µm) |
| MECHANICAL PROPERTIES (SIDE COMPRESSION) | LESS THAN OR EQUAL TO 0.1dB | 1200N/25mm (@1.55µm) |
| (BENDING) | LESS THAN OR EQUAL TO 0.1dB | R30, ±90°×10C (@1.55µm) |
| (IMPACT) | LESS THAN OR EQUAL TO 0.1dB | 0.3kg·m×1C (@1.55µm) |
| (TORSION) | LESS THAN OR EQUAL TO 0.1dB | L=1m, ±90°×1C (@1.55µm) |
| (TENSION) | LESS THAN OR EQUAL TO 0.1dB | 70kg (@1.55µm) |

OPTICAL FIBER DROP CABLE AND MANUFACTURING METHOD THEREOF

BACKGROUND OF THE INVENTION

Conventionally, in order to make it possible for a home or an office to receive and transmit high-speed broad band information like ultra high speed data, FTTH (Fiber to the home) i.e. an access line optical fiber cable extended from a telephone company is dropped down to a subscriber's home such as a building, a house of the general public via an optical fiber cable core wire, and an optical fiber drop cable has been used as a suitable means for wiring. In short, the optical fiber drop cable (an outdoor cable) is a cable used when dropping an optical fiber down from a utility pole into the home.

As a related optical fiber drop cable known is as shown in FIG. 1. The optical fiber drop cable 101 comprises an optical element portion 109 and a support wire portion 113, and an optical fiber tape core wire 103 for example of 0.25 mm diameter and steel wires 105 as tension bodies disposed on both sides of the optical fiber tape core wire for example of 0.4 mm diameter are covered with a thermoplastic resin 107 such as a PVC, a flame-retarded polyolefin to form the optical element portion, and a steel wire 111 as tension body for example of 1.2 mm diameter is covered with the thermoplastic resin 107 such as a PVC, a flame-retarded polyolefin to form the support wire portion. These portions are paralleled one another and are continuously or intermittently fixed together at a thin neck portion.

When a cable is anchored on a utility pole or a building/a house of the general public, it is anchored by means of the support wire portion 113 as a messenger wire after separating the support wire portion 113 from the optical element portion 109 utilizing the thin neck portion.

Taking out the optical fiber tape core wire 103 by tearing off the optical element portion 109 right and left utilizing notch portions 117 which is provided at the central part of the optical element portion, one end of the optical fiber tape core wire is connected to some other fiber within a closure disposed on the utility pole and the other end is connected to a connection box or an OE converter disposed in or out of the house.

SUMMARY OF THE INVENTION

1. Flexible Plastic Material

The conventional optical fiber drop cable 101 described above is liable to an accident by lightning strike, for example, burning of indoor equipments. Therefore, the accident may be avoided either by cutting off the conventional optical fiber drop cable 101 within the connection box disposed on the walls of the building and the house of general public in order not to drop the optical fiber drop cable directly into the house, or by cutting off only the steel wire 105 in the optical element portion 109 using a specific tool in order to drop the cable without the steel wire into the house. Besides, the support wire portion 113 has little problem because it will be cut off when the cable is anchored on the utility pole or under eaves of the house of the general public.

According to the present invention, an optical fiber drop cable, which protects an accident by lightning strike and also has low cost, and a manufacturing method thereof can be provided.

According to the first technical aspect of the present invention, an optical fiber drop cable 1 comprising: an optical element portion 9 where an optical fiber core wire 3 and at least one pair of first tension bodies 5, 5 disposed parallel on both sides of the optical fiber core wire are covered with a cable sheath; and a cable support wire portion 15 where a second tension body 11 is covered with a sheath 13, wherein both of the portions are fixed together continuously or intermittently, and said first tension bodies are composed of a plastic material. The tensile elastic modulus of said plastic material is preferably between 10000–50000 $N/mm^2$. Further, a cross section of said first tension bodies is preferably noncircular.

According to the second technical aspect of the present invention, a manufacturing method of the optical element portion 9 of the optical fiber drop cable 1, wherein said optical element portion is fixed to the cable support portion 15 along the primary axis of said cable, and said optical element portion includes first tension bodies 5, 5 comprising a flexible plastic material 37 and an optical fiber core wire 3, 29 all of which are covered with a cable sheath 7 consisting of a resin 39, comprises the steps of: (i) running said optical fiber core wire 29 in the prescribed direction; (ii) extruding said flexible plastic material 37 synchronizing with the running of said optical fiber core wire; and (iii) extruding said resin 39 synchronizing with the running of said optical fiber core wire 29, said flexible plastic material contacting said resin before the plastic material solidifies.

2. Molding of an Electrically Nonconductive Material

Generally, with regard to the optical fiber drop cable 101 having weak adhesion between the tension bodies 105 and the cable sheath 107, there have been such problems that troubles like increase in optical transmission loss or breakdown of the optical fiber core wire 103 might occur when bending, squeezing, etc. were applied, most likely when thermal hysteresis such as heat cycle were additionally applied.

Thus, the adhesion (drawing force) between the tension bodies 105 within the optical element portion 109 and the cable sheath 107 is a necessary item for the characteristics of the optical fiber drop cable. However, when the optical fiber drop cable 101 is manufactured by extrusion molding, simple plain extrusion molding of the electrically nonconductive material such as glass fiber, aramid fiber, FRP being used for the tension bodies 105 within the optical element portion 109 together with the support wire 111, the optical fiber core wire 103, etc. cannot provide suitable adhesion. Therefore, conventionally, an adhesive layer is interposed between the tension bodies 105 and the cable sheath 107 so as to increase adhesion described above, resulting in high cost because of increased manufacturing processes.

According to the present invention, the adhesion between the tension bodies within the optical element portion and the cable sheath is enhanced without interposing the adhesive layer. Moreover, the optical fiber drop cable can be provided with increased anti-torsion characteristics and ability to protect the increase in optical transmission loss.

According to the third technical aspect of the present invention, an optical drop cable 201 comprising: an optical element portion 207 having an optical fiber core wire 205 and a pair of first tension bodies 213, 213, each of said first tension bodies being disposed substantially parallel along the primary axis of said cable on both sides of said optical fiber core wire intervening between them, said pair of the first tension bodies and said optical fiber core wire are covered with a cable sheath 203; and a cable support wire portion 211, including a second tension body 217 covered with a sheath 219, said optical element portion 207 and said cable support wire portion 211 being fixed together along the primary axis of said optical fiber drop cable 201, wherein said first tension bodies are composed of an electrically nonconductive material and a circumference thereof is formed into a rugged shape.

BRIEF DESCRIPTION OF THE DRAWINGS

FIG. 7 is a table showing properties of a PET string employed for trial production of the cable.

FIG. 8 is a table showing properties of the optical fiber drop cable, which has been manufactured in trial production.

FIG. 9 is a cross section of the optical fiber drop cable according to the second embodiment.

FIG. 10 is across section of the first tension body according to the second embodiment, and (A) is of an 8-spines asteroid shape, (B) of a cross shape, (C) of a star shape.

FIG. 12 is a table showing comparison between drawing force of a sample 1 and that of a sample 2.

FIG. 13 is a table showing a result of characteristics evaluation for the optical fiber drop cable according to the second embodiment.

DESCRIPTION OF THE PREFERRED EMBODIMENT

Figure 1:
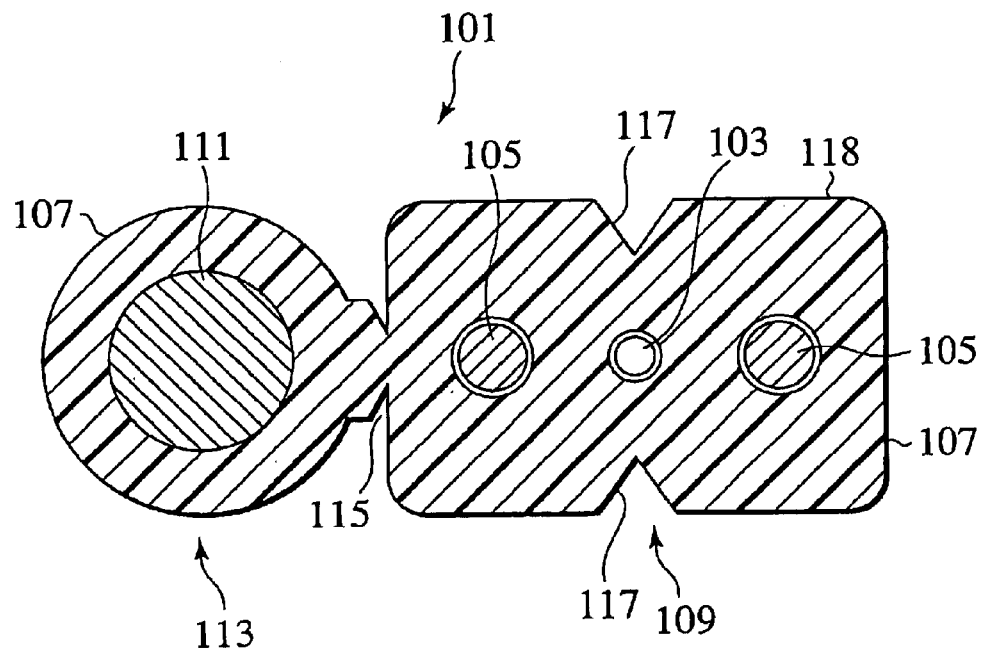
FIG. 1 is a lateral cross section showing a conventional optical fiber drop cable.

In the following, the embodiments of the present invention will be described in details referring to the drawings.

Figure 2:
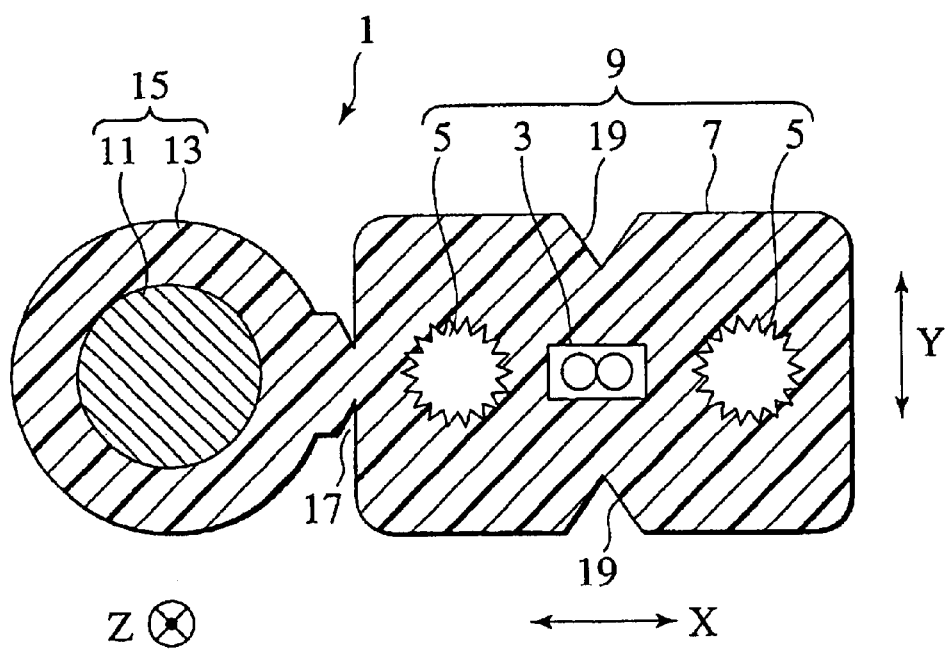
FIG. 2 is a lateral cross section showing an optical fiber drop cable of the present invention.

Referring now to FIG. 2, a long span optical element portion 9 is formed by covering at least one pair of first tension bodies 5 disposed on both sides of an optical fiber core wire 3 intervening between them substantially parallel to the primary axis of a cable with a cable sheath 7 comprising a thermoplastic resin such as polyethylene, poly-vinyl-chloride (PVC). And, said first tension body are composed of a electrically nonconductive plastic material with high tensile strength such as PET, Nylon, PP. Besides, the optical fiber core wire is for example a double cored optical fiber tape core wire.

Said optical element portion 9 and a cable support wire portion 15 as a messenger wire, made by covering a long span second tension body 11 disposed adjacent and parallel to the optical element portion 9 with a sheath 13 comprising a thermoplastic resin e.g. said polyethylene, poly-vinyl-chloride (PVC), etc., are fixed together continuously or intermittently via a narrowed neck portion 17. Since said second tension body 11 comprising a steel wire etc. should be fastened to a outdoor anchor as described below, when the steel wire is employed, the outer diameter of the wire is desired to be less than or equal to 1.4 mm, preferably less than or equal to 1.2 mm in consideration to its workability.

The end portions of the cable is torn off left and right utilizing notch portions 19 which is provided at the central part of the optical element portion 9, taking out the optical fiber tape core wire 3, one end of the core wire is connected to some other fiber within a closure disposed on a utility pole and the other end is connected to a connection box or an OE converter disposed in or out of the house.

Further, the common material to the cable sheath 7 and the sheath 13 is used as the cable sheath of both said optical element portion 9 and the cable support wire portion 15, extruding both of the sheaths at the same time to cover both portions, but each of the portions may be combined together using different resins respectively.

Moreover, said optical element portion 9 and cable support wire portion 15 may be manufactured separately to be affixed together intermittently by the third binding means such as a plastic binding wire, a plastics binding tool.

Since the first tension bodies are composed of an electrically nonconductive flexible plastic material with high tensile strength e.g. PET, Nylon, PP, etc., treatment of the first tension bodies with a specific tool can be omitted, and a construction time can be shortened. Also, setting of outdoor connection boxes and connection to an indoor cable become unnecessary and it is effective in reduction in goods cost and decrease in the construction time.

Since the flexible plastic material used as said first tension bodies 5 have a role as a tension body, it is required to have a rather high tensile elastic modulus, preferably higher than or equal to 10000 N/mm$^2$. And, when it has too high tensile elastic modulus, it is liable to be broken and an allowable bending radius is also liable to be limited, the modulus is desired to be less than or equal to 50000 N/mm$^2$. Thus, by means of selecting the tensile elastic modulus of the plastic material to be between 10000–50000 N/mm2, it is now able to protect accident by lightning strike as well as to realize the low cost optical fiber drop cable 1.

First Embodiment

An optical fiber drop cable 1 where PET string, one example of a plastic material, was used as first tension bodies 5 within an optical element portion 9, was manufactured as a trial production. The properties of the PET string used in the trial production of the cable according to the present embodiment are as shown in FIG. 7. And, also the properties of the optical fiber drop cable manufactured through the trial production are as shown in FIG. 8.

As a result of evaluating the optical fiber drop cable 1 with the properties shown in FIG. 8, it was confirmed that the cable had such properties as to be actually used without any problems.

Figure 3:
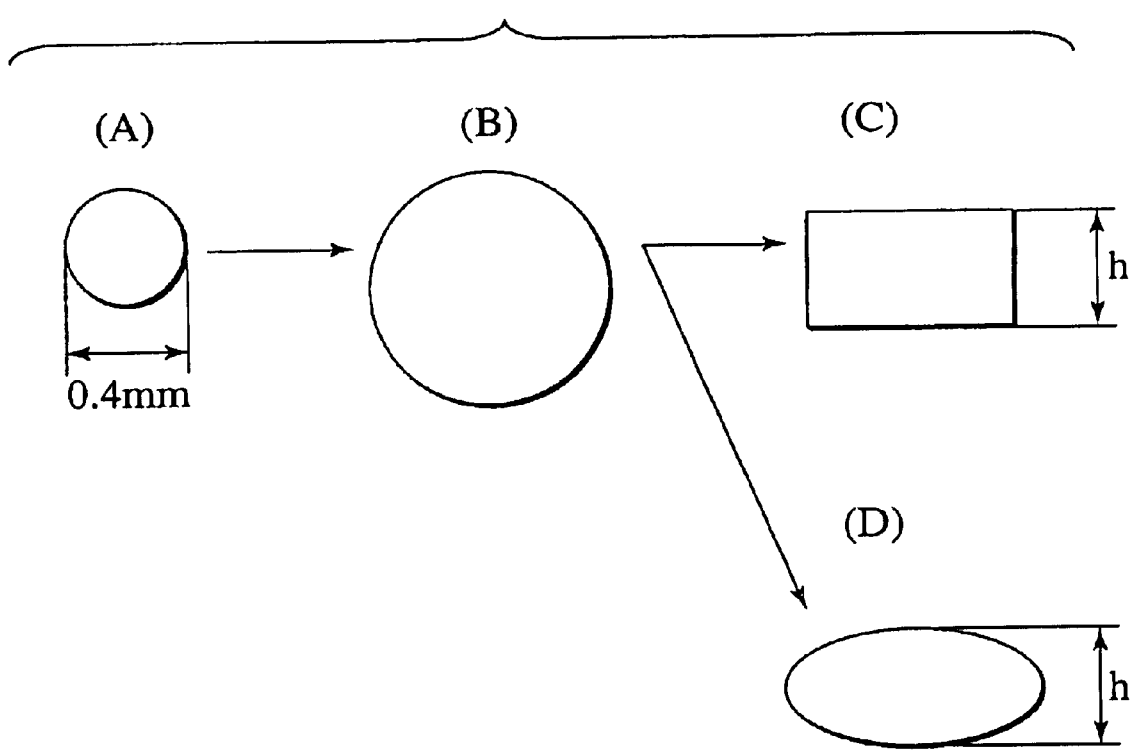
FIGS. 3 (A), (B), (C), (D) are diagrams illustrating cross-sections of first tension bodies.

For the first tension bodies 5 within the optical element portion 9, a steel wire with an outer diameter of $r_w$=0.4 mm as shown in FIG. 3 (A) has conventionally been used, and a major diameter of the cable, $R_w$ has been such that $R_w$=4.5 mm. Since it had been confirmed that even reduction to a half of the tensile strength still gave no effect to cable characteristics, in the trial production of the drop cable using a steel wire as the first tension bodies 5, the drop cable with such tensile strength as half of the conventional one was manufactured in the trial production using a plastic material as the first tension bodies.

Since the elastic modulus of the plastic material is about 1/10 of that of the steel wire, the diameter of the first tension bodies 5 must be chosen as r=0.9 mm as shown in FIG. 3(B) which is √5 times (about 2.2 times) of the outer diameter of the steel wire shown in FIG. 3 (A). As there are two first tension bodies, the major diameter R of the cable makes 5.5 mm resulting in about 20% increase in wind pressure load, because wind pressure comes up to $R/R_w$=5.5/4.5≈1.2 times.

As shown in FIGS. 3 (C), (D), by changing the shape of a cross section into a rectangle (C) or an ellipse (D) keeping the cross sectional area constant, so as to make the height h of the cross section in the direction of the major diameter (X-direction) smaller, the height h can be kept almost the same as the outer diameter of the steel wire. Therefore, the shape of the cross section having the necessary tensile strength can be realized using the plastic material without any increase in the major diameter of the cable.

Thus, by means of making the material of the first tension bodies plastic, it is possible to make the shape of the cross section not only circular but also noncircular optionally desirable e.g. rectangular, elliptical, etc. Additionally, material of any desirable shape is easily available, and design can be done at low price and with much degree of freedom. Further, when a plastic material is used as the first tension bodies, by designing the shape of the cross section of the tension bodies so as to make a component in the direction of the major diameter of the cable (X-direction) shorter, the shorter major diameter of the optical fiber drop cable 1, the reduction in wind pressure load under aerial environment, and the decrease in fracture probability of the optical fiber can be achieved. That is to say, the shape of the cross section is formed to be a noncircular one flattened in the direction of the minor diameter of the cable (Y-direction).

Manufacturing Process of the Optical Element Portion

Figure 4:
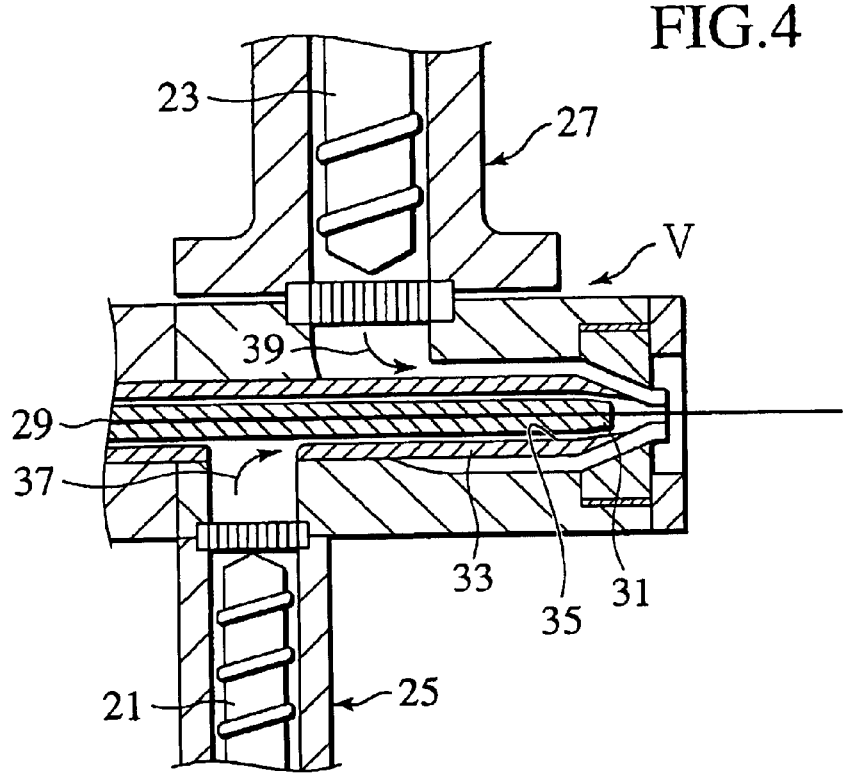
FIG. 4 is a cross section of an extruder used in manufacture of the optical fiber drop cable.

The manufacturing process of the optical element portion according to the present invention will be described. As shown in FIG. 4, using extruders 25, 27 having 2 screws 21, 23, (1) an optical fiber core wire 29 is run through a first hollow member 31 from the left hand side to the right direction of FIG. 4, and
(2) a plastic material 37 as the first tension bodies is extruded by the extruder 25 through a channel 35 which is formed between a second hollow member 33 provided outside the first hollow member 31, and
(3) a resin 39 (PVC, flame-retarded polyolefin, etc.) of which a cable sheath is composed, is extruded by the extruder 27 outside the second hollow member 33 by means of said screws 21, 23.

Figure 5:
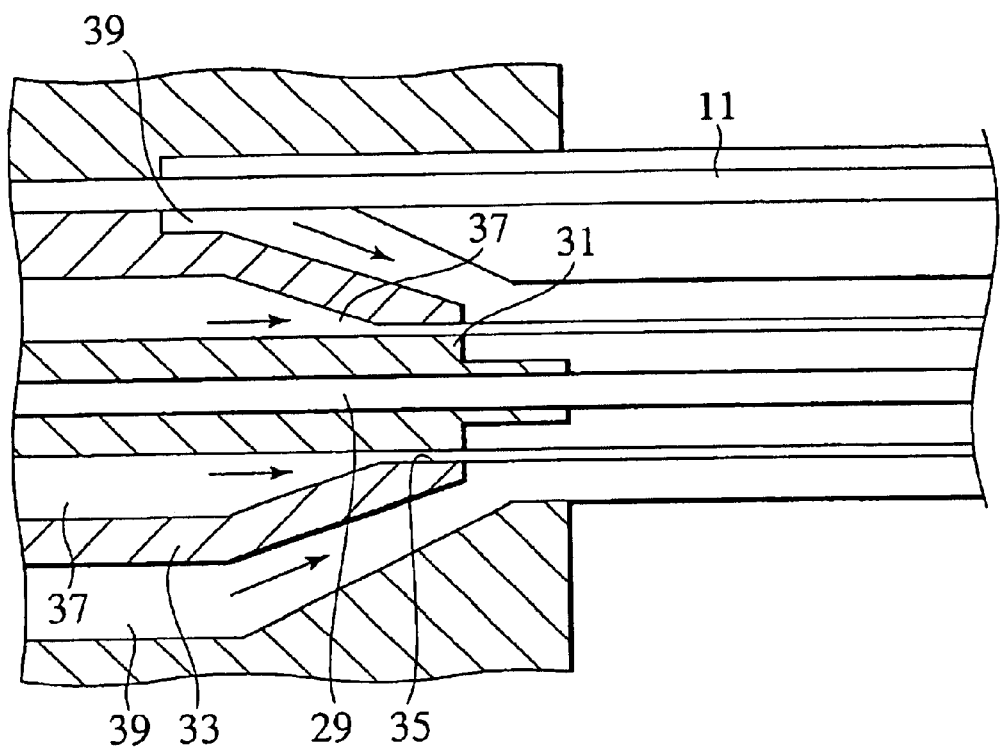
FIG. 5 is an enlarged diagram of the arrow IV view in FIG. 4.

As a result of the processes described above, as shown in FIG. 5, the plastic material 37 extruded to the right direction contacts said resin 39 (PVC, flame-retarded polyolefin, etc.) before the plastics solidifies, and then the optical element portion 9 of the optical fiber drop cable 1 is completed after cooling the plastics.

Thus, through extrusion of the plastic material 37, which will be the first tension bodies 5 of the optical element portion 9, together with the resin 39 (PVC, flame-retarded polyolefin, etc.) at the same time, the optical element portion with the prescribed cross-sectional structure can be manufactured by only one process at low cost. A long span cable can be manufactured without limitation by the length of the first tension bodies 5.

Lead-in of the Optical Fiber Drop Cable

Figure 6:
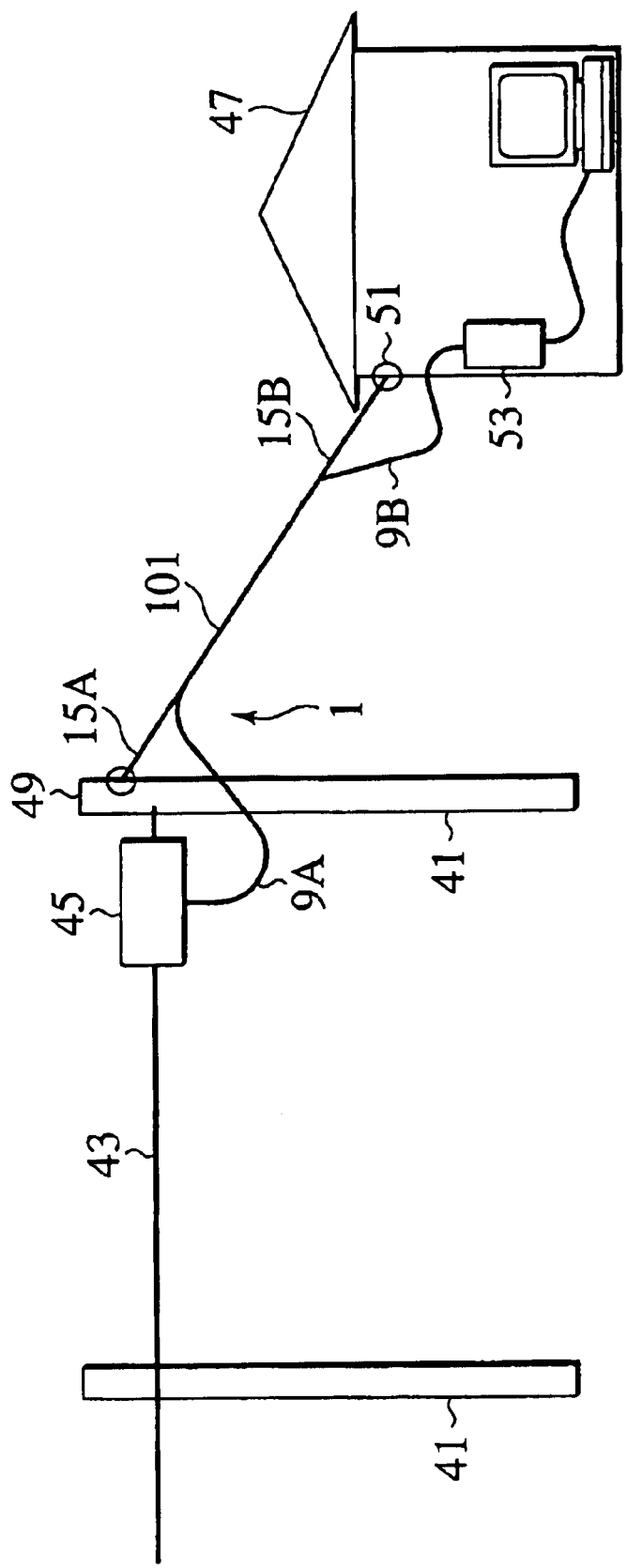
FIG. 6 is a diagram illustrating a state of working of the present invention.

Next, described is a method of lead-in of the optical fiber drop cable 1 referring to FIG. 6. In FIG. 6, the optical fiber drop cable is wired between a cable branch joint box (closure) 45 which is equipped onto an end portion of an aerial fiber cable 43 extended from a telephone company and a subscriber's house 47, and the optical fiber tape core wire 3 is dropped from said aerial fiber cable 43 into the home.

And, when the optical fiber core wire 3 is dropped down from the aerial fiber cable 43 extended from the telephone company into each home using the optical fiber drop cable 1, said optical element portion 9 and the cable support wire portion 15 are separated by tearing off a part of the neck portion at both end portions of the optical fiber drop cable 1, one end portion 15A of the separated cable support wire portion 15 is fastened to an outdoor anchor 49 on the utility pole and the other end portion 15B is fastened to a part of the house via an anchor 51.

One end portion 9A of said optical element portion 9 is connected to the cable branch joint box (closure) 45 on the utility pole, and the other end portion 9B is connected to the indoor OE converter or to another optical fiber within a termination box 53. Besides, one end of the plastic material used as the material of the first tension bodies 5 of said optical element portion 9 is fastened to the cable branch joint box (closure) 45, and the other end is fastened to the indoor OE converter or the termination box 53.

The present invention is not limited to the embodiment mentioned above and can be worked in another form by adding any appropriate change. As understood from the above description of the embodiment of the present invention, because the first tension body is an electrically nonconductive material comprising a flexible plastic material, protection of danger by lightning strike can be achieved and the cable can be led directly into the house. Further, since treatment of the first tension bodies with a specific tool can be omitted, a construction time can be shortened, and also setting of outdoor connection boxes and connection to an indoor cable become unnecessary and it is effective in reduction in goods cost.

By choosing the tensile elastic modulus of the plastic material between 10000 and 50000 N/mm$^2$, the material has such appropriate tensile properties as to protect buckling of the tension bodies when tearing off the optical element portion from the support wire portion and to allow the optical element portion to be directly led into the house.

Further, by keeping the shape of the cross section of the tension body optionally desirable, it become possible to maintain the outer diameter of the cable smaller which affects significantly the wind pressure load in the aerial wiring condition and fracture probability of the optical fiber can be reduced owing to its effect.

Second Embodiment

In the following, the second embodiment of the present invention will be described referring to the drawings. Referring now to FIG. 9, an optical fiber drop cable 1 according to this embodiment comprises a long span optical element portion 207 where an optical fiber single core wire or an optical fiber tape core wire formed by covering an optical fiber 205A with a plastic material (hereafter, they are generally referred to an optical fiber core wire 205) is embedded in the sheath 203, and a long span cable support wire portion 211 as a messenger wire disposed parallel and fixed continuously or intermittently to the optical element portion 207 via a narrowed neck portion.

The optical element portion 207 comprises the optical fiber core wire 205 and at least one pair of long span tension bodies 213 disposed parallel on both sides of the core wire interposed between them, and they are covered with the cable sheath 203 composed of a thermoplastic resin such as polyethylene (PE), poly-vinyl-chloride (PVC) to form the long span optical element portion 207. The flexible plastic used in the first embodiment can be also used in the present embodiment.

A circumference of each tension body 213 is formed into a rugged shape. That is, referring to FIG. 9, the shape of a cross section perpendicular to the longitudinal axis of the tension bodies 213 is an 8-spines quasi-asteroid and/or an octagonal asterisk, and mechanical bonding force (adhesion) between the tension bodies 213 and the cable sheath 203 is enhanced by anchoring of the rugged shape.

Referring now to FIG. 10, the cross-sectional shape of the tension bodies 213 is, in FIG. 10(A), an enlarged one of the 8-spines quasi-asteroid in FIG. 9, and a cross shown in FIG. 10(B), a star shown in FIG. 10(C), or another shape such that the circumference of the tension bodies 213 with many dotted protrusions may be adopted.

Besides, since the electrically nonconductive material such as glass fiber, aramid fiber, FRP are used for the tension bodies 213 above, the accident by electromagnetic induction due to lightning strike an be avoided. And, the long span optical element portion 207 above is provided with notch portions 215 for tearing off the cable in order to take out the optical fiber core wire 205 disposed on both left and right sides of the cable sheath 203 in FIG. 9.

The cable support wire portion 211 comprises a so-called support wire 217 as the second tension body and a thermoplastic resin sheath 219 covering it. Said support wire 217 is composed of a metallic wire, e.g. a steel wire. The long span cable support wire portion 211 formed as above is integrally connected parallel and adjacent to the long span optical element portion 207 mentioned above via the narrowed neck portion 209.

Molding of the Optical Fiber Drop Cable

Figure 11:
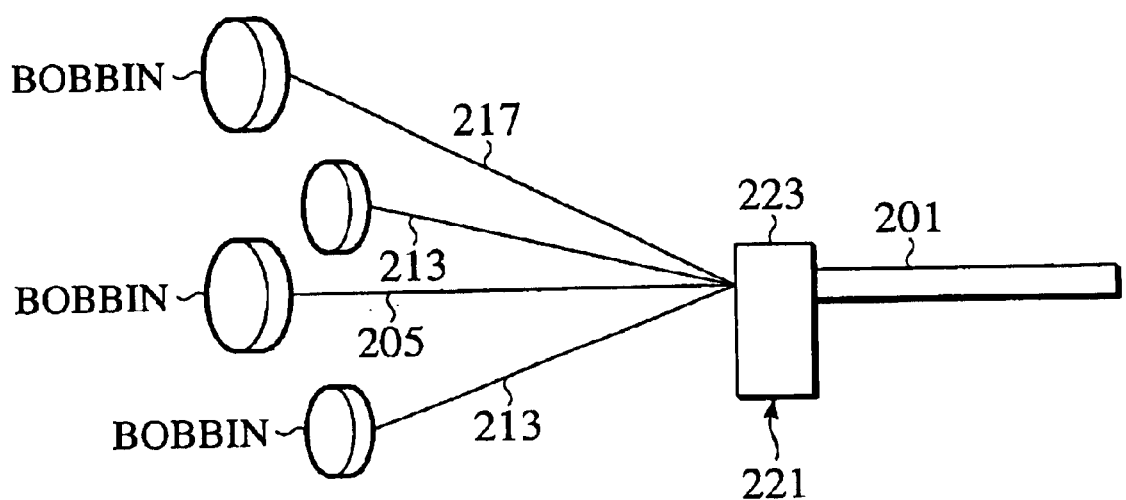
FIG. 11 is a schematic diagram showing a manufacturing method of the optical fiber drop cable according to the second embodiment.

A manufacturing method of the optical fiber drop cable 201 according to the above embodiment is described. Referring to FIG. 11, an extruding apparatus 221 for molding the optical fiber drop cable 210 is schematically shown, and the optical fiber core wire 205 and a pair of the tension bodies 213 disposed parallel on both sides of the core wire and also the support wire 217 are supplied to the given position within an extrusion head 223 which acts as an extrusion metal mold of the extruding apparatus 221. Additionally, the optical fiber core wire 205, the torsion bodies 213, the support wire 217 are supplied from bobbins respectively.

The thermoplastic resin common to the cable sheaths 203, 219 of the optical element portion 207 and the cable support wire portion 211 is extruded to cover both portions within the extrusion head 223 at the same time and both portions are bonded integrally. Accordingly, when the optical fiber core wire 205 and the tension bodies 213 are covered with the cable sheath 203, the support wire 217 is also covered at the same time with the sheath 219 in the mold. In this case, the cable sheath 203 and the sheath 219 are a common sheath.

Further, in order to compare the adhesion between the tension body and the cable sheath of the optical fiber drop cable 201 according to the above embodiment with that of the conventional optical fiber drop cable, the conventional optical fiber drop cable as a reference (sample 1) and the optical fiber drop cable 201 according to the present embodiment (sample 2) were manufactured. Still further, PET strings were used as the first tension bodies (the tension bodies 213 in sample 2) in sample 1 and sample 2, and the cross sectional shapes of said PET strings are, as shown in FIG. 12, a circle of 0.6 mm diameter in sample 1, an octagonal asterisk of 0.6 mm circumcircle diameter and 0.4 mm incircle diameter in sample 2. Moreover, drawing force of each tension body in sample 2 are shown in FIG. 12.

As described above, the drawing force of the first tension body in sample 1 is about 1–5 N/cm, but that in sample 2 is 10 N/cm, and the cable 201 in the present embodiment shows 2 times more drawing force than that of the conventional cable. Since the contact area in sample 2 is only 20% or less greater than that in sample 1, it is recognized that such increase in drawing force is due to the contribution of anchoring resulting from the shape of a quasi-asteroid. That is to say, since the circumference of the tension body 213 is formed into a rugged shape, the adhesion between the tension body 213 and the cable sheath 203 was enhanced by leaps and bounds through increase in contact area due to the rugged shape plus the anchor effect. Therefore, since application of adhesive, etc. as in conventional manner is not needed for enhancement of the adhesion between the tension bodies 213 and the cable sheath 213, productivity of the cable is increased. Further, general properties of the optical fiber drop cable 201 in sample 2 above are as shown in FIG. 13.

As seen in FIG. 13, the properties of sample 2 are equivalent to those of a typical optical fiber drop cable. Additionally, the cause of increase in optical transmission loss is considered that torsion strain of the cable twisted uniformly at a given span may be concentrated into a very short span of the cable due to temperature change, and since anti-torsion characteristics are enhanced because of restraint to torsion due to the rugged shape of the circumference of the tension bodies 213 in the present embodiment, protection against the increase in the optical transmission loss turns to be possible.

Further, the present invention is not limited to the embodiments described above, and it can be worked in another form by adding any appropriate change.

Since the circumference of the first tension bodies is formed into a rugged shape according to the present embodiment, the adhesion between the first tension bodies and the cable sheath can be enhanced because of the anchor effect of the rugged shape, and further increase in the optical transmission loss is also avoided by enhancing the anti-torsion characteristics of the cable owing to said rugged shape. Moreover, productivity of the cable can be enhanced, since conventional application of adhesive is unnecessary during extrusion molding.

This application claims benefit of priority under 35USC §119 to Japanese Patent Applications No. 2001-267045, filed on September 4, and No. 2002-004573, filed on Jan. 11, 2002, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An optical fiber drop cable comprising:

an optical element portion comprising an optical fiber and a pair of first tension bodies covered with a first sheath; and a support wire portion comprising a second tension body covered with a second sheath, wherein said first tension bodies include a flexible plastic material and do not include a non-plastic material.

2. The optical fiber drop cable according to claim 1, wherein a tensile elastic modulus of said plastic material is between 10000 and 50000 N/mm$^2$.

3. The optical fiber drop cable according to claim 2, wherein a cross section of at least one of said first tension bodies is noncircular.

4. The optical fiber drop cable according to claim 3, wherein the cross section is flattened in a direction of a minor axis of said cable.

5. A manufacturing method of an optical element portion of an optical fiber drop cable, comprising steps of:
running an optical fiber in a prescribed direction;
extruding a flexible plastic material to form a tension body having a concave portion synchronously with the running of said optical fiber; and
extruding a resin to form a sheath synchronously with the running of said optical fiber filling the concave portion of the tension body.

6. An optical fiber drop cable comprising:
an optical element portion comprising an optical fiber and a pair of first tension bodies covered with a first sheath; and
a support wire portion comprising a second tension body covered with a second sheath,
wherein at least one of said first tension bodies has a cross section including a concave portion.

7. An optical fiber drop cable comprising:
an optical element portion having an optical fiber core wire and a pair of first tension bodies, each of said first tension bodies being disposed substantially parallel to a primary axis of said cable on both sides of said optical fiber core wire which is interposed between them, said pair of the first tension bodies and said optical fiber core wire are covered with a cable sheath; and
a cable support wire portion including a second tension body covered with a sheath, said optical element portion and said cable support wire portion being fixed together along the primary axis of said optical fiber drop cable,
wherein said first tension bodies are composed of an electrically nonconductive material, and the circumference thereof is formed into a rugged shape, and
said rugged shape is a 8-spines quasi-asteroid.

8. The optical fiber drop cable according to claim 1, wherein lengths of the first tension bodies extend parallel to a length of the optical fiber, the first tension bodies disposed on opposite sides of the optical fiber.

9. The optical fiber drop cable according to claim 8, wherein a length of the optical element portion extends parallel to a length of the support wire portion, the optical element portion connected to the support wire portion.

10. The optical fiber drop cable according to claim 1, wherein a cross section of at least one of the first tension bodies is one of an ellipse and a polygon.

11. The optical fiber drop cable according to claim 6, wherein lengths of the first tension bodies extend parallel to a length of the optical fiber, the first tension bodies disposed on opposite sides of the optical fiber.

12. The optical fiber drop cable according to claim 11, wherein a length of the optical element portion extends parallel to a length of the support wire portion, the optical element portion connected to the support wire portion.

13. The optical fiber drop cable according to claim 6, wherein at least one of said first tension bodies comprises an electrically nonconductive material.

* * * * *